(No Model.)
J. BLATTNER.
STEAM OR AIR COUPLING FOR CARS.
No. 457,246. Patented Aug. 4, 1891.
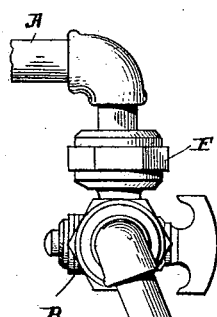
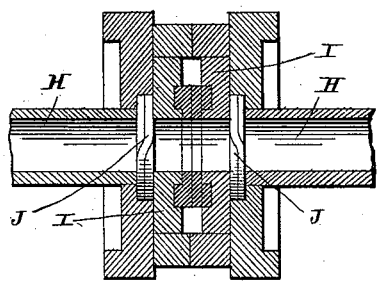
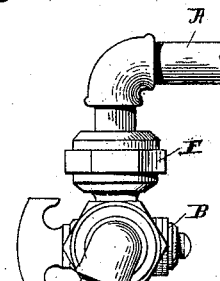
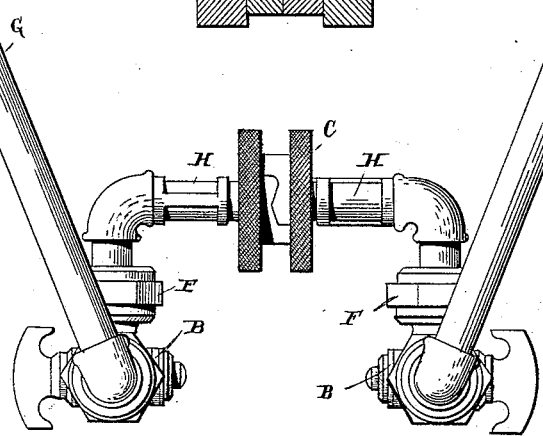
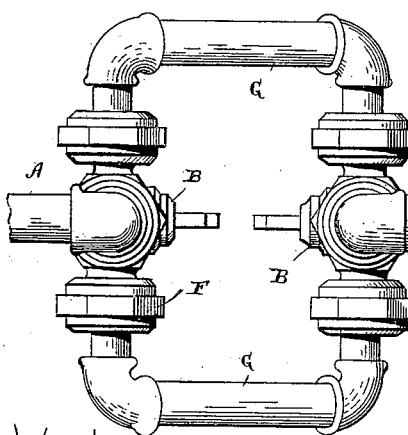
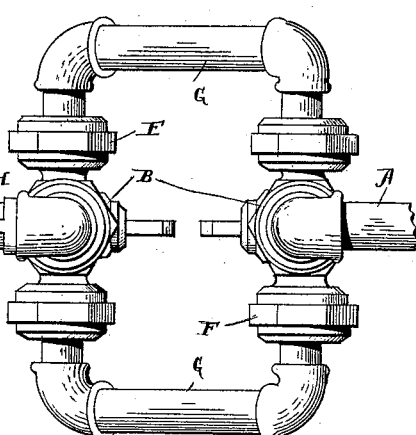

UNITED STATES PATENT OFFICE.

JOSEPH BLATTNER, OF ALLEGHENY, PENNSYLVANIA.

STEAM OR AIR COUPLING FOR CARS.

SPECIFICATION forming part of Letters Patent No. 457,246, dated August 4, 1891.

Application filed April 14, 1891. Serial No. 388,851. (No model.)

*To all whom it may concern:*

Be it known that I, JOSEPH BLATTNER, of Allegheny, in the county of Allegheny and State of Pennsylvania, have invented certain new and useful Improvements in Steam or Air Couplings for Cars; and I do hereby declare the following to be a full, clear, and exact description of the invention, such as will enable others skilled in the art to which it pertains to make and use it, reference being had to the accompanying drawings, which form part of this specification.

My invention relates to an improvement in steam or air couplings for cars; and it consists in the combination, construction, and arrangement of parts which will be fully described hereinafter, and pointed out in the claims.

The object of my invention is to provide a universal coupling for the steam and air pipes upon cars, and which not only have a universal movement to accommodate themselves to the movement of the cars, but are provided with double pipes and suitable valves, so that in case one of the pipes should burst the air or steam can be turned through another with but very little inconvenience or loss of time.

Figure 1 is a side elevation of a coupling which embodies my invention. Fig. 2 is a plan view of the same. Figs. 3 and 4 are sectional details.

A represents the ends of the air or steam pipes, which extend along under the cars and which are loosely connected to the three-way valves or cocks B by the loose coupling C, which allows the valves or cocks and their attachments a free horizontal turning movement. In order to form a tight joint and prevent leakage where the ends of the pipes A are connected to the valves, the pipes A are provided with flanges D at a suitable distance from their lower ends, and these flanged ends fit in packed chambers or recesses formed in the pipe which extends from the valve or cock. Placed upon the top of the flange upon the pipe A are the flanged rings E, which extend slightly above the screw-threaded pipe or portion of the valve, and down upon the top of this flanged ring is screwed the nut F. The nut bears down upon the ring and forces it tightly down upon the flange upon the pipe A, and thus forms an air and steam joint.

Each one of the four valves or cocks here shown is of the ordinary make, and each one has three passages or pipes leading from it, and each pipe or passage is screw-threaded at its end, and each pipe that is connected to each one of the valves or cocks is provided with a flange, and in connection with this flange is used a ring and a nut, as above described. Connected to opposite ends of each of the four valves are the steam or air conducting pipes G, and which may either be used singly or together, as may be desired. In case any one or two of the pipes G should explode or become injured, the other pipe or pipes may be used by simply turning the valves so that the steam or air will pass through them. Extending from each one of the two lower valves or cocks are the angular pipes H, which have flanges formed upon their free ends, and any suitable packing rings or gaskets applied to these ends so as to form a tight joint when brought together. Placed upon the end just back of these flanges are the couplings I, which have an eccentric motion, and each coupling is provided with a spring J, which enable the inclines upon the couplings to ride over each other and to hold the couplings tightly in contact with each other. Whenever it is desired to couple or uncouple the cars, it is only necessary to give one or both of the couplings a slight turn. The pipes A and H stand in a line with each other at all times and have a free turning movement upon the valves or cocks directly at right angles to the couplings which are formed with the pipes G, and hence the two rectangular frames have a universal joint or movement which enables the coupling to accommodate itself freely to any movements of the cars. As above stated, each one of the rectangular frames being provided with two three-way cocks or valves, the steam or air can be passed through both of the pipes of each frame or through either one alone or entirely cut off at the will of the operator.

Although the coupling here shown is especially intended for use upon cars, it is evident that it may also be used wherever a free universal movement is required in couplings for water or gas pipes. If so desired, a loose joint may be placed upon the ends of the pipes A at the points where they are turned downward to make connection with the valves.

Having thus described my invention, I claim—

1. In a steam or air coupling for cars, two rectangular hollow frames, each consisting of end pieces having a horizontal turning joint at their centers and a vertical turning joint at each side thereof, and side pipes which have their ends connected with the said vertical turning joints, and a pipe connected to the horizontal joints of the inner ends of the said frames, substantially as shown and described.

2. In a steam or air coupling, two rectangular hollow frames, each consisting of hollow end pieces having a horizontal central turning joint, a vertical turning joint at each side thereof, side U-shaped pipes which have their ends connected with the said vertical turning joints, a horizontal valve in each end piece below the said horizontal joints, and a pipe connected to the horizontal joints of the inner ends of the said frames, the parts combined substantially as described.

3. In a steam or air coupling for cars, two rectangular hollow frames, each consisting of hollow end pieces having a horizontal central turning joint, a vertical turning joint at each side thereof, side U-shaped pipes which have their ends connected with the said vertical turning joints, L-shaped pipes connected at one end to the said horizontal turning joints of the inner ends of the said frames, and a coupling for connecting the opposite and upper ends of these L-shaped pipes which together form a ∩-shaped connection between the inner ends of the frames, the parts combined to operate substantially as set forth.

In testimony whereof I affix my signature in presence of two witnesses.

JOSEPH BLATTNER.

Witnesses:
F. A. LEHMANN,
B. BROCKETT.